Figure 1:
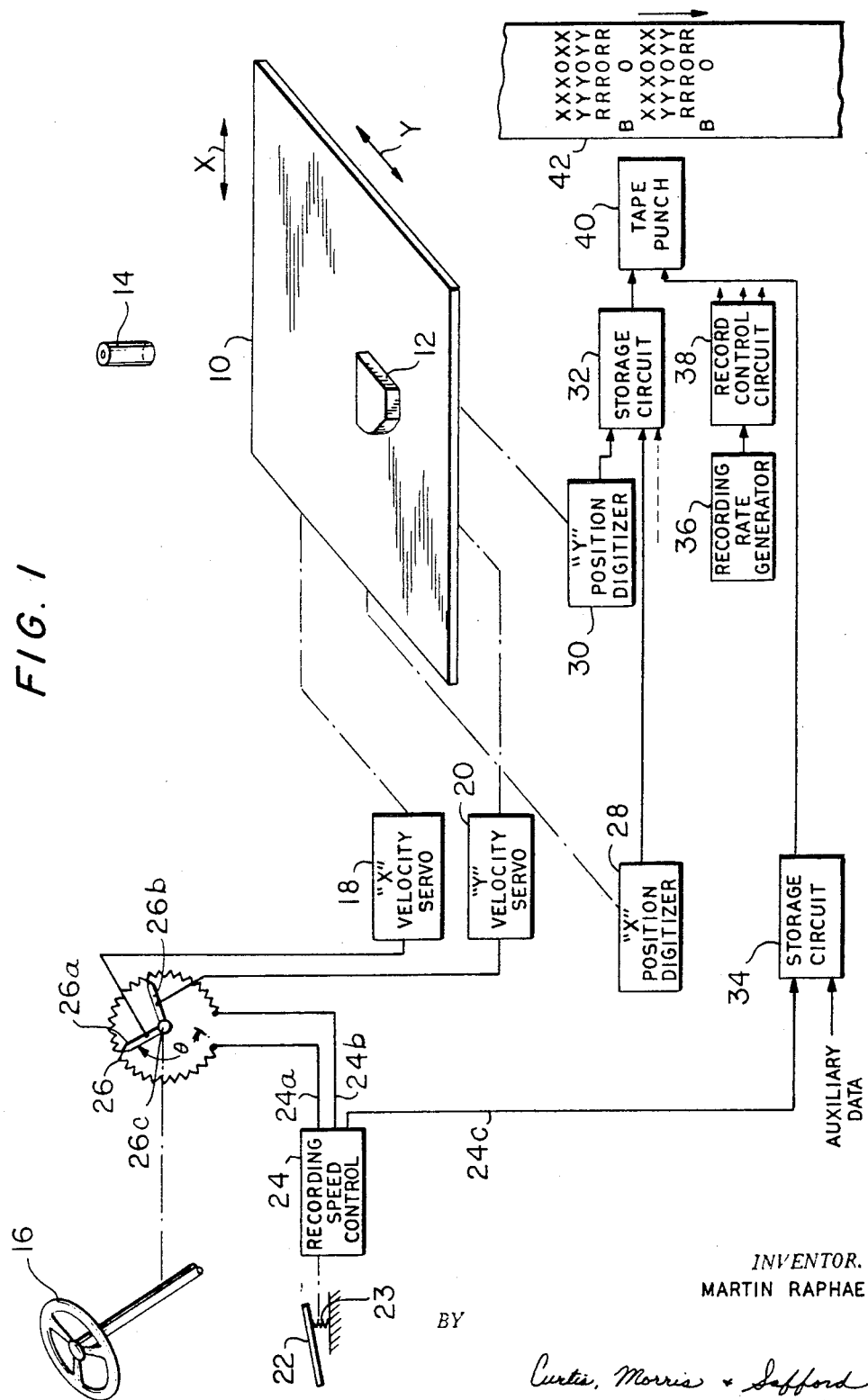

Dec. 24, 1968 M. RAPHAEL 3,418,548
CONTOUR TRACING AND TRACKING SYSTEM
Filed April 5, 1966 3 Sheets-Sheet 1

INVENTOR.
MARTIN RAPHAEL
BY
Curtis, Morris & Safford
ATTORNEYS

Dec. 24, 1968   M. RAPHAEL   3,418,548
CONTOUR TRACING AND TRACKING SYSTEM
Filed April 5, 1966   3 Sheets-Sheet 2

INVENTOR.
MARTIN RAPHAEL
BY
Curtis, Morris & Safford
ATTORNEYS

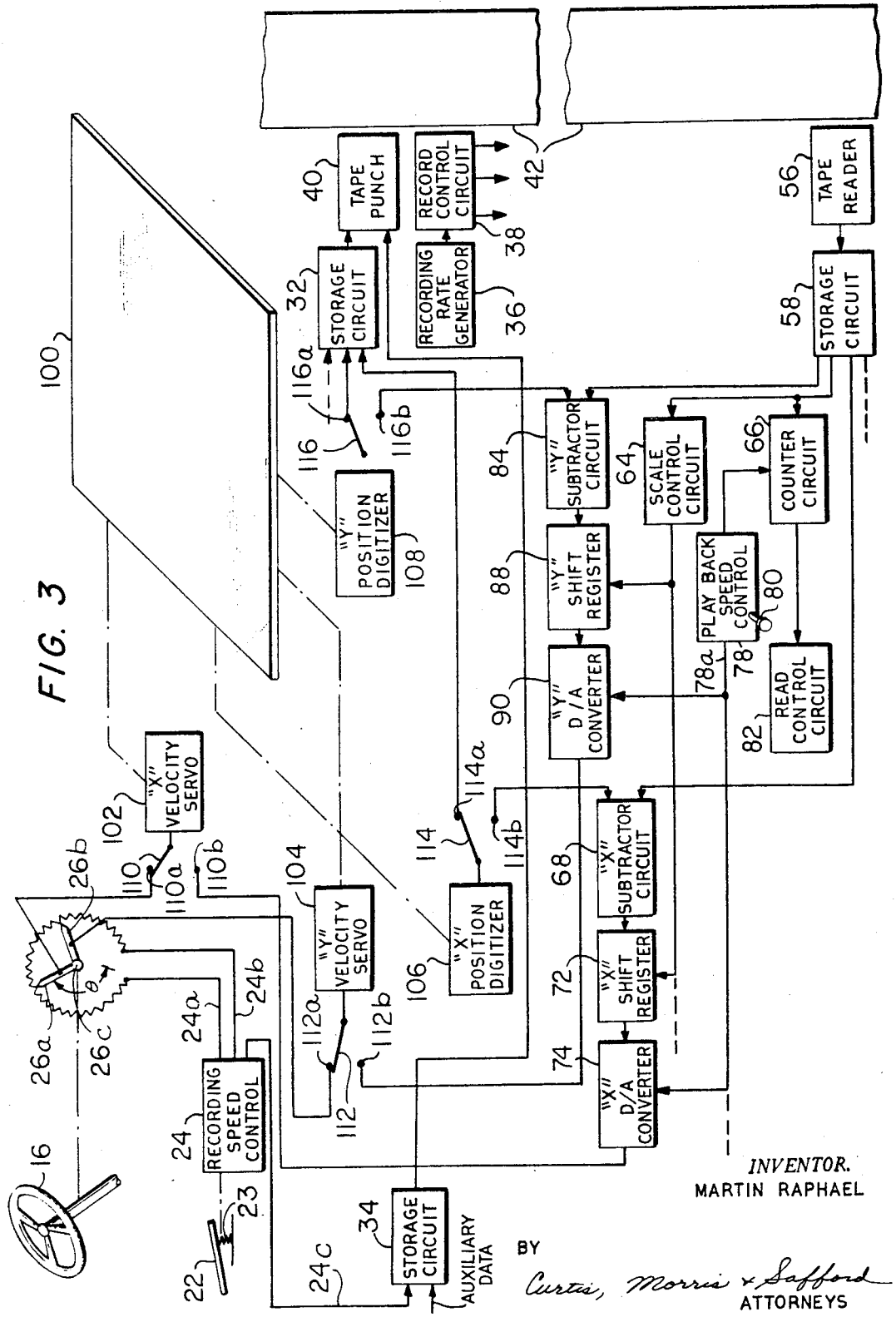

United States Patent Office 3,418,548
Patented Dec. 24, 1968

1

3,418,548
CONTOUR TRACING AND TRACKING SYSTEM
Martin Raphael, Garden City, N.Y., assignor, by mesne assignments, to United Aircraft Corporation, Windsor Locks, Conn., a corporation of Delaware
Filed Apr. 5, 1966, Ser. No. 540,276
15 Claims. (Cl. 318—18)

The present invention relates to apparatus for tracing and tracking a curve or contour and has particular application in a numerical control system in which the operation of a machine is automatically controlled.

Presently, much time and effort is being devoted to automating industrial machines and production techniques. One of the areas receiving much attention is that of numerical controls. In a numerical control system, a controlled machine is operated automatically in response to input control signals. The controlled machine may be a standard machine, such as a drill press, welder or milling machine, or it may be a special purpose machine designed to perform a unique and particular function. The input control signals provide "instructions" to the controlled machine as to how, when, where and for how long the controlled machine is to operate. Very often, the input control signals are either derived directly from a computer or from a recording medium such as magnetic or punched tape on which data from a computer has been stored. In either case, a computer is employed at some point in the development of the input control signals.

A major disadvantage in employing a computer in a numerical control system is that an equation describing the contour or curve to be followed must be derived. Oftentimes this curve or contour is of an extremely complex nature and requires an excessive amount of time and effort in its derivation. In addition, the more complex the equation, the longer the time required for programming the computer to solve the equation and converting the equation into usable form such as a punched tape.

In view of the foregoing, it is an object of the present invention to provide new and improved machine control apparatus which provides for the following of a desired contour in its machining operation but does not require a mathematical description of the contour to be followed.

It is another object of the present invention to provide numerical control apparatus which does not require a computer in the development of the input control signals.

In one system constructed in accordance with the present invention, input control data is obtained by physically tracing the desired contour instead of by deriving a mathematical expression for the contour. As this contour is being traced, data as to position and speed of tracing is measured and is recorded and stored in the recording portion of the system. Control signals are derived from the stored data and are used to control the operation of machines in a manner similar to that described above. The portion of the system used to perform these functions is termed the "play back" apparatus.

In many machines, control of the speed of movement of the work piece is an important factor. For example, in welders, if the speed of movement of the work piece is too slow, the work piece is apt to become burned; if the speed of movement is too fast, the welding seam will not adhere to the work piece.

Accordingly, another object of the present invention is to provide a system for developing machine guidance data by the physical tracing of the desired contour or curve in which the speed of the machining operation can be controlled readily and accurately, and which is simple and accurate in its operation.

In the present invention, the tracing speed is sampled and variations of the tracing speed are compensated for during the controlled machining operation. Thus, for those applications where control of the speed of movement of the work piece is an important factor, the present invention is capable of providing the required speed control regardless of variations and irregularities in the tracing speed. This is ideal for a system in which a human operator does the tracing since the tracing speed set by such an operator has many inherent irregularities.

For a better understanding of the present invention, together with other and further objects thereof, reference is had to the following description taken in connection with the accompanying drawings.

Figure 2:
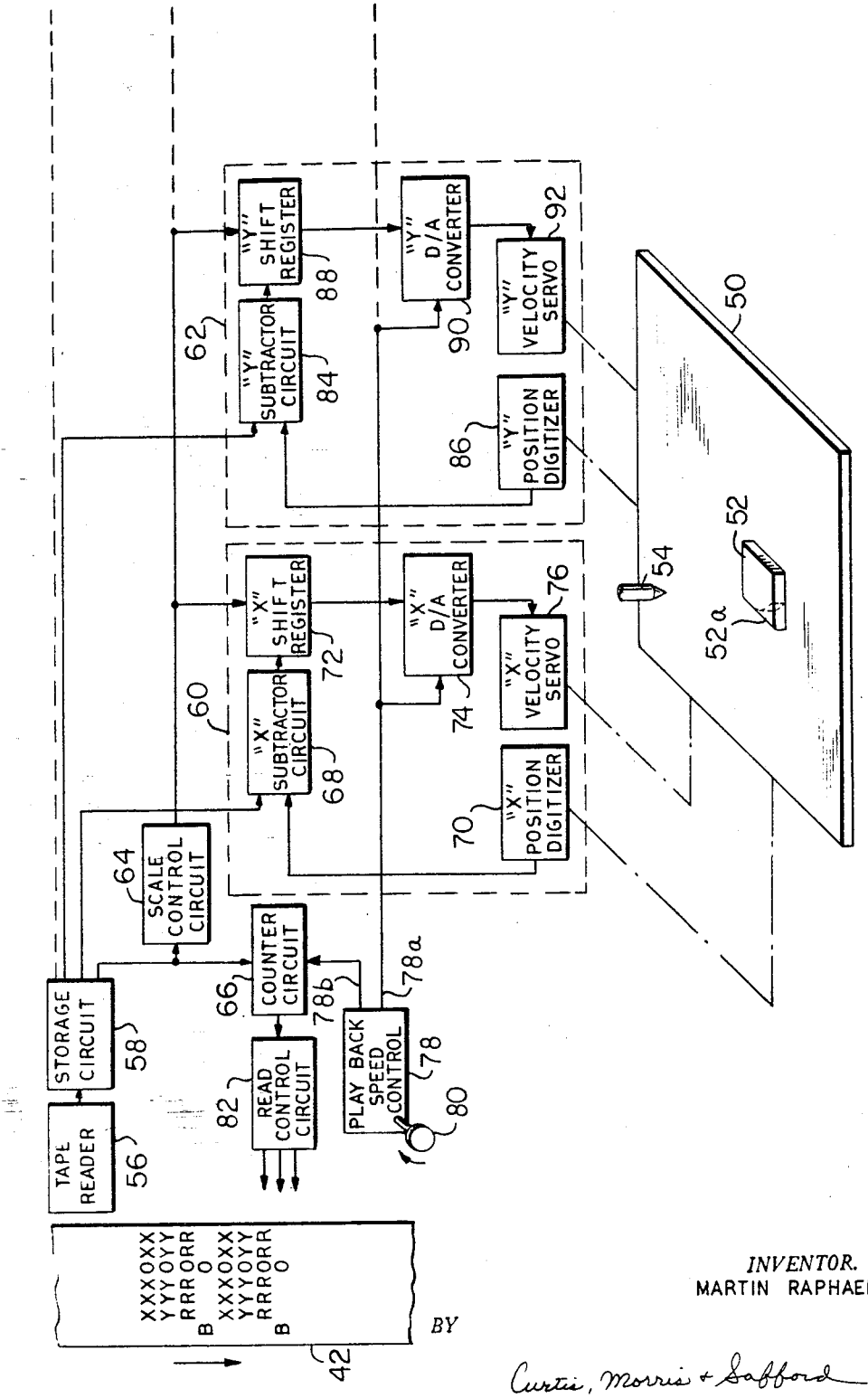

Referring to the drawings:

FIGURES 1 and 2 show the recording and play back portions, respectively, of one system constructed in accordance with the present invention; and FIGURE 3 shows a second embodiment of a system constructed in accordance with the present invention.

The recording portion of the system shown in FIGURE 1 includes a movable tracing table 10 to which is secured a "prototype" article 12, that is, an article having a contour which is to be traced. Referring to FIGURE 2 which shows the play back portion of the system, a work piece 52 is secured to a movable "tracking" table 50. By way of example only, it is desired to remove portion 52a, defined by the dotted lines, from the work piece so that its shape will be identical to that of the prototype article 12. This removal of portion 52a may be accomplished by moving the work piece article 52 under a cutting tool 54.

The input control data for moving the tracking table 50 past the cutting tool 54 is developed by moving the tracing table 10 (see FIGURE 1) in such a manner that the prototype article 12 passes a reference point, such as an eyepiece 14, in the same way that the work piece 52 during play back or tracking, is to pass the cutting tool 54. The movement of the tracing table 10 may include a series of back and forth movements which, when reproduced during play back by the tracking table 50, will cause the work piece 52 to pass the cutting tool 54 in the proper way to effect the desired cuts.

The recording portion of the system is provided with a steering wheel 16 by means of which an operator steers the movement of tracing table 10. The steering wheel 16 is mechanically coupled to the common drive shaft 26c of wiper arms 26a and 26b of a "sine-cosine" potentiometer 26 and drives the wiper arms together in response to the movement of the steering wheel 16. Wiper arms 26a and 26b are connected, respectively, to the inputs of an X velocity servo system 18 and a Y velocity servo system 20, both of conventional construction and operation. The servo systems 18 and 20 are, in turn, coupled to the tracing table 10 through suitable drive systems of conventional design to move the table 10 in the directions indicated by the arrows X and Y in FIGURE 1.

The speed at which the tracing table 10 is moved is controlled by the operator by, for example, depressing a pedal 22 which may be similar to the accelerator pedal of an automobile. The pedal 22 is mechanically coupled to a recording speed control unit 24 which, for the embodiment illustrated, is a circuit which provides an analog output signal across the output leads 24a and 24b having an amplitude dependent upon, preferably proportional to, the position of the pedal 22. This analog output signal is applied across the sine-cosine potentiometer 26. As is well known, a sine-cosine potentiometer provides on one wiper arm a voltage which is proportional to the sine of the angle $\theta$ through which the shaft of the potentiometer is turned from a starting position, and (on the other wiper, a voltage which is proportional to the cosine of the angle $\theta$. Thus, the sine-cosine potentiometer 26 provides voltages to the velocity servo systems 18 and 20 which are proportional to, respectively, the sine or cosine of the angle through which the wipers are driven by the steering wheel 16, and to the magnitude of the signal from the recording speed control. These voltages are supplied to the X and Y velocity servo systems 18 and 20 which move the tracing table 10 in accordance with movements of the steering wheel 16. Thus, by turning the steering wheel 16 and depressing the pedal 22, the operator "drives" the prototype article 12 past the eyepiece 14 so that the desired contour is traced. The speed of tracing may vary in accordance with the abilities or preferences of the operator. For example, on relatively straight segments of the contour he may trace at high speeds while slowing down so as to accurately follow sharp curves. It may be that the operator wishes to stop tracing entirely for a period of time. In any of these events, the present invention assures that the speed of the machining operation performed on the work piece 52 will progress at a proper speed and without delays.

The recording speed control unit 24 may be of conventional design. One possible arrangement would employ a multi-deck switch, the moving contacts of which are controlled by the position of the pedal 22. Associated with one deck of the multi-deck switch is conventional circuitry which provides an analog output signal dependent upon the position of the moving contacts of the switch. Associated with a second deck of the multi-deck switch are wires which provide a digital signal on output lead 24c representing the analog voltage on leads 24a and 24b. The digital signal supplied along output lead 24c also corresponds to the position of pedal 22. This digital signal is supplied to a storage circuit 34, of conventional construction and operation, which may include conventional flip-flop circuitry.

As the tracing table 10 is moved to trace the desired contour on the prototype article 12, X and Y position digitizers 28 and 30, respectively, of conventional construction and operation, and coupled to the tracing table 10 in a suitable manner, sense the position of the table and develop tracing position signals representative of the positions of the table as the contour is being traced. The digitizers 28 and 30 may, for example, include rotary shaft encoders or linear encoders which provide digital signals corresponding to the position of the tracing table 10. When employing a rotary shaft encoder, the encoder is normally coupled to the last rotating shaft of the drive system for the particular axis and rotates with this drive shaft. The output signal of the encoder corresponds to the angular position of the encoder shaft which, in turn, is representative of the position of the tracing table since the shaft encoder is coupled to the system which drives the table. When employing a linear encoder, one part of the encoder is placed on the tracing table 10, while a second part is stationary. The output signal of the linear encoder provides a measure of the relative positions of these two parts of the encoder and, therefore, a measure of the position of the table. The tracing position signals developed by the position digitizers 28 and 30 are supplied to a storage circuit 32 which also is of conventional construction and operation and similar to storage circuit 34.

A timing circuit, designated as a recording rate generator 36, serves as a source of timing signals which control the cycle of operation of the recording portion of the system. In particular, the recording rate generator may be any conventional oscillator, such as an astable multivibrator, which supplies timing signals, in pulse form, at regular prescribed time intervals. These signals serve to control the recording interval at which data corresponding to the position of the tracing table 10 and the velocity at which the table is being moved is recorded. The timing signals from the recording rate generator 36 are supplied to a record control circuit 38.

The record control circuit 38 serves to control the delivery of X and Y position signals and velocity signals to a conventional tape-punch device 40 which punches a tape 42 in accordance with the signals it receives, thus recording the position and velocity data for use in the "play back" portion of the system. The tape 42 is shown prior to being punched. Data from digitizers 28 and 30 corresponding to the positions in the X and Y directions is punched on the lines having the X's and Y's while digital data from recording speed control unit 24 corresponding to the tracing velocity is punched on the lines having the R's.

The storage circuit 34 is shown as having a second input designated AUXILIARY DATA. Such an input is included to receive data corresponding, for example, to a code which identifies the tape, the machine to be controlled or other control data to be used when the work piece is fabricated. This data is punched on the tape on the lines having the B's.

The tape-punch device 40 can be of either the "sequential-punch" type where each row of data is punched in sequence after the other row, or the "parallel" type which punches all of the X, Y, R and B rows at the same time. If a sequential-punch device is used, appropriate timing, switching and interconnecting circuitry is provided in control circuit 38 for connecting the X and Y digitizers to storage circuit 32 and connecting the recording speed control unit 24 to storage circuit 34 for a short instant of time starting with the generation of a timing pulse by pulse generator 36. This causes the digital signals provided by the digitizers to be stored in their respective storage devices. Then, after time delays created by the control circuitry, or in response to further timing pulses, the X, Y, R and B data signals are read out of the respective storage circuits in whatever timed sequence is required by the tape-punch device 40.

If a "parallel" type punch device 40 is used, the operation is the same as described, except that the storage circuits 34 and 32 then are used as "buffers"; that is, they are used to isolate the various digitizers from the tape-punch device and ensure that all of the digital signals are delivered at the same time. Another difference between this and the circuitry used with the sequential tape-punch device is that all of the digital signals are delivered to the punch device at the same time so that there is no need for timing circuitry or pulses for timing the sequential read out from the storage devices.

Preferably, the timing pulses developed by pulse generator 36 are of a frequency such that the digitizers are "sampled," i.e. connected to deliver their digital outputs to the storage units, at relatively frequent time intervals, e.g. 0.1 second, so as to give a relatively smooth variation in the signals for use in the play back portion of the system.

As described above, the recording system measures the X and Y components of the position of the table 10, together with the velocity of tracing in order to compensate for tracing speed variations caused by the operator. Also, the operator may leave the machine for a period of time without causing errors in the machining operation. When he lifts his foot off of the pedal 22, its spring 23 returns it to a "zero" velocity position. In this position, the voltage of potentiometer 26 is zero, and the table 10 is stationary. Means (not shown) is provided for de-activating the tape-punch 40 and its associated equipment upon the return of the pedal 22 to the zero position to ensure that these components will not operate until the operator returns. When he does return, he can re-activate the system merely by depressing the pedal 22—without his absence having interfered with the operation of the system.

In order to provide a fuller understanding of the system shown in FIGURES 1 and 2, a mathematical description of its operation follows. As previously indicated, the recording rate generator 36 supplies timing signals so that the position and speed digitizers 28, 30 and 24 are sampled at regular prescribed time intervals. Since the operator of the tracing table is apt to trace the contour at different speeds at different times, or may stop work entirely for a period of time, the distance between points at which sampling takes place and data is recorded can, therefore, vary. Because information is recorded at uniform time intervals, the data recorded corresponding to the tracing velocity will therefore, also represent the length of the segment traversed between sampling and recording points. Since:

$$D_R = V_R t \quad (1)$$

where $D_R$ is the distance along the contour;
$V_R$ is the tracing velocity; and
$t$ is the recording time interval then:

$$D_R = V_R t = R_S K \quad (2)$$

where $R_S$ is recorded velocity data; and
$K$ is a constant.

As mentioned hereinabove, in many machine operations it is desirable to move the work piece relative to the tool at a relatively constant velocity and yet follow precisely the contour of the prototype. The play back system to be described below provides this type of operation despite the fact that the recorded velocity signals it receives vary with speed variations caused by the human operator. This is done by moving the table 50 (FIGURE 2) at a constant velocity $V_P$ in short but smoothly interconnected increments each of which is equal in length to one of the incremental movements of the tracing table 10 (FIGURE 1) between timing pulses produced by pulse generator 36. The time duration $T_P$ of each incremental movement of the tracking table 50 is controlled so that the distance $D_P$ moved during the incremental play back movement is equal to the distance $D$ moved during the corresponding incremental movement of tracing table 10. That is:

$$D_P = D_R = R_S K \quad (3)$$

The distance $D_P$ is equal to the product of the tracking table velocity $V_P$ times the time duration $T_P$ of the incremental movement of the tracking table; that is:

$$D_P = V_P T_P \quad (4)$$

Then, by substitution from Equation 4 to Equation 3, the time $T_P$ is given by the following equation:

$$T_P = R_S K / V_P \quad (5)$$

The tracking table 50 (FIGURE 2) is moved by a pair of servo systems 76 and 92 similar to servo systems 18 and 20 which move the tracing table 10 (FIGURE 1). Therefore, it is necessary to develop voltages of the proper magnitudes for each of the servo systems to move the table a distance $D_P$ in the proper direction.

Two digitizers 70 and 86 which are similar to digitizers 28 and 30 in FIGURE 1 develop digital signals representative of the X and Y coordinates of the tracking table 50. These signals are subtracted from X and Y signals read from the tape 42 representing the next position to which the table 50 is to be moved, thus, providing incremental X and Y signals. However, these incremental signals are a direct function of $V_R t$ or $D$ rather than $V_P T$, as is desired. Hence, each signal is corrected or "normalized" by dividing it by $V_R t = D = R_S K$. Then it is multiplied by $V_P$ to give a voltage signal of proper magnitude. The normalized X servo system signal $$N_{\dot{X}}$$

is:

$$N_{\dot{X}} = \frac{X_N - X_{N-1}}{R_S K} = \frac{\Delta X}{R_S K} \quad (6)$$

where $X_n$ is the X position signal from the tape 42 representing the point to which the tracking table is to move; and
$X_{N-1}$ is the signal from position digitizer 70 representing the point at which the tracking table is located.

Similarly, $$N_{\dot{Y}}$$

is:

$$N_{\dot{Y}} = \frac{Y_N - Y_{N-1}}{R_S K} = \frac{\Delta Y}{R_S K} \quad (7)$$

where the symbols have meanings corresponding to their counterparts in Equation 6.

Then, as is indicated above, these components are multiplied by $V_P$ to give voltage signals $\dot{X}$ and $\dot{Y}$ of proper magnitude. Thus:

$$\dot{X} = N_{\dot{X}} V_P \quad (8)$$
$$\dot{Y} = N_{\dot{Y}} V_P \quad (9)$$

The details of the play back system of the present invention now will be discussed to show how the above principles are utilized to provide improved machine control.

Referring to FIGURE 2, the paper tape 42 previously punched with information as to tracing positions and tracing speeds is fed through a tape reader device 56 of conventional construction and operation. The tape reader 56 senses the punched signals on the paper tape and develops digital control signals corresponding to the X, Y, R and B signals recorded on the tape. Control signals developed by the tape reader 56 are stored in a storage circuit 58 similar to the storage circuits 32 and 34. Regardless of whether the tape reader 56 is of the "parallel" or "sequential" type, the storage circuit 58 serves to store the signals so that all the signals representative of the data for a particular "block" (i.e. an X, Y, R and B group) of information may be supplied simultaneously to control the tracking table 50. Also, the circuit 58 serves to isolate the tape reader from the rest of the circuitry.

Control signals representative of the tracing positions in the X direction are read out from storage circuit 58 to a drive circuit 60, while control signals representative of the tracing positions in the Y direction are read out from circuit 58 to an identical drive circuit 62. At the same time control signals representative of the tracing speeds are supplied to a scale control circuit 64 and a counter circuit 66, the functions of which will be described in greater detail hereinafter. The counter circuit 66 is set by each tracing speed signal it receives to a count proportional to the particular tracing speed signal.

The drive circuit 60 includes an X subtractor circuit 68 to which the X position signals are fed from storage circuit 58. Similarly, drive circuit 62 includes a Y subtractor circuit 84 to which the Y signals are conducted. The subtractor circuits 68 and 84 are arithmetic circuits composed of AND gates and flip-flops which provide output signals dependent upon the difference between two input signals.

The signals supplied to the X subtractor circuit 68 from the storage circuit 58 represent the points in the X direction to which the tracking table 50 is to be moved and similarly the signals supplied to the Y subtractor circuit 84 represent the points in the Y direction to which the tracking table is to be moved. At the same time, tracking position signals representative of the actual X and Y positions of the tracking table 50 also are supplied to the X subtractor circuit 68 from the X position digitizer 70, and to the Y subtractor circuit 84 from the Y position digitizer 86. The position digitizers 70 and 86 sense the position of the tracking table 50 and develop tracking position signals, in digital form, which are representative of the position of the table 50 at the particular instants.

The subtractor circuits 68 and 84, functioning in the usual manner, perform electronic digital subtraction and develop output signals, in digital form, which are a measure of the difference between the desired position to which the tracking table 50 is to be moved and the actual position of the table 50. In the case of the X subtractor circuit 68, the output signals represent ΔX in the numerator in Equation 6 which corresponds to the segment length, in the X direction, which must be tracked by the play back portion of the system. The corresponding segment length in the Y direction ΔY which must be tracked by the play back portion of the system is represented by the output signals from the Y subtractor circuit 84.

The output signals from the subtractor circuits 68 and 84 are supplied to X and Y shift registers 72 and 88, respectively. The shift registers 72 and 88 employ conventional flip-flop circuitry. Also supplied to both of the shift registers 72 and 88 is an output signal from the scale control circuit 64. The scale control circuit 64, responsive to the control signals from the storage circuit 58 representative of the tracing speeds, develops an output signal which provides a scaling factor for the shift registers 72 and 88. In particular, the scale control circuit 64 develops an output signal composed of a pulse train for each tracing speed control signal supplied from the storage circuit 58. The number of pulses in the pulse train corresponds to the particular tracing speed represented by the tracing speed control signal. The scale control circuit 64 may include a conventional counter which is set by the tracing speed control signal and which automatically counts down to zero after being set. Each down count develops a pulse which is part of the output pulse train.

The pulses from the scale control circuit 64 shift the data stored in the shift registers 72 and 88 so that each of the quantities corresponding to ΔX and ΔY in the shift registers is divided by the tracing speed control signal associated with the tracing position signals from which the ΔX and ΔY quantities were developed. This operation introduces $R_S$ in the denominator of Equations 6 and 7 and corresponds to the normalization of the X and Y velocity components. The scaling of ΔX and ΔY is accomplished by shifting the data in shift registers 72 and 88. Each pulse in the pulse train developed by the scale control circuit 64 causes a shift in the data stored in the shift registers.

The shift registers 72 and 88 are emptied into X and Y Digital to Analog converters 74 and 90, both of conventional construction and operation, which develop analog signals proportional to the X and Y velocity components $\dot{X}$ and $\dot{Y}$, respectively. The desired play back velocity, $V_P$ in Equations 8 and 9 is introduced by way of a signal from a play back speed control unit 78 along an output lead 78a. The play back speed control unit 78 supplies an analog signal along lead 78a, which is proportional to the desired play back speed, to the D/A converters 74 and 90. This analog signal serves as a reference signal for the D/A converters 74 and 90 so that analog output signals from the two D/A converters correspond to the desired X and Y velocity components. The play back speed is set, for example, by means of a knob 80 on the play back speed control unit 78.

The play back speed control unit 78 may include a potentiometer and a conventional voltage controlled oscillator. The position of the knob 80 would determine the position of the wiper arm of the potentiometer and this may serve to develop the desired analog signal which is used as the reference signal for the D/A converters 74 and 90. The potentiometer may also control the voltage controlled oscillator so that the signals developed by the voltage controlled oscillator have a frequency which is dependent upon the position of the potentiometer. This signal is available at output lead 78b of the play back speed control unit. The purpose of this signal will be explained in more detail hereinafter.

The output signals from the D/A converters 74 and 90 are supplied to X and Y velocity servo systems 76 and 92, respectively, both of conventional construction and operation. The servo systems 76 and 92 are, in turn, coupled to the tracking table 50 through suitable drive systems of conventional design so as to move the tracking table along a path similar to the one traced by the recording portion of the system.

The output signals from the play back speed control unit 78 which are available at output lead 78b are supplied to the counter circuit 66 which counts these signals. When the count of the counter circuit 66, in response to the signals from the play back speed control unit 78, corresponds to the previously set initial count proportional to the tracing speed, the counter circuit develops a carry signal which, in turn, is supplied to a read control circuit 82. The time interval required for the counter circuit 66 to generate a carry signal corresponds to the time T of Equation 5.

The carry signals developed by the counter circuit 66 control the cycle of operation of the play back portion of the system. The read control circuit 82, designed along conventional lines, serves to control the component circuits of the play back portion of the system in essentially the same manner as the record control circuit 38 controls the component circuits in the recording portion of the system. The arrows leading from the read control circuit 82 signify its general function. In particular, the counter circuit 66 and the read control circuit 82 determine the times at which the tape reader 56 is to sense the information punched on the paper tape 42 and when the control signals derived by the tape reader are to be stored in the storage circuit 58. In addition, the counter circuit 66 and the read control circuit 82 determine the times at which the position digitizers 70 and 82 are sampled and the times at which the shift registers 72 and 88 are emptied.

FIGURE 3 shows a second embodiment of the tracing and tracking system constructed in accordance with the present invention. The prime difference between the system shown in FIGURE 3 and the one shown in FIGURES 1 and 2 is that in the FIGURE 3 system many of the component parts of the system are employed during both the recording and play back cycles. In certain cases, this arrangement may be preferred to the system of FIGURES 1 and 2, while in other cases the system of FIGURES 1 and 2 may be preferred.

Referring to FIGURE 3, the table 100 serves both as a tracing and tracking table. The table 100 is driven by means of X and Y velocity servo systems 102 and 104, respectively, during both the recording and play back cycles of operation. The position of the table 100 is sensed by X and Y position digitizers 106 and 108, respectively, during both the recording and play back cycles of operation. A pair of switches 110 and 112 are provided at the inputs to the velocity servo systems 102 and 104, respectively. The switches 110 and 112 move between terminals 110a, 110b and 112a, 112b. A second pair of switches 114 and 116 are provided at the outputs of the position digitizers 106 and 108, respectively. The switches 114 and 116 move between terminals 114a, 114b and 116a, 116b. The remainder of the system of FIGURE 3 is similar to the system of FIGURES 1 and 2 so that corresponding elements have been given the same reference numerals. Wiper arm 26a of the sine-cosine potentiometer 26 is connected to terminal 110a, while wiper arm 26b of the sine-cosine potentiometer is connected to terminal 112a. The X D/A converter 74 is connected to terminal 110b, while the Y D/A converter 90 is connected to terminal 112b. Terminals 114a and 116a are connected to storage circuit 32, while terminal 114b is connected to the input of the X subtractor circuit 68 and terminal 116b is connected to the input of Y subtractor circuit 84.

With the switches 110, 112, 114 and 116 in the position illustrated in FIGURE 3, the system is set for the recording cycle. The system is connected similarly to the recording equipment shown in FIGURE 1. Once the desired contour has been traced and the tracing speed and tracing position signals recorded on the paper tape 42, the switches 110, 112, 114 and 116 are moved to their respective opposite terminals, thereby conditioning the system for play back. When so conditioned, the system functions in the manner described in connection with FIGURE 2.

Although not shown in FIGURE 3, the storage circuits 32 and 58 may be the same circuit which would first be used during the recording cycle and then used during the play back cycle. Such an arrangement would require additional switching circuitry. The storage circuits have been shown separately in FIGURE 3 in order to simplify the explanation of the operation of this system.

Both of the tracing and tracking systems just described may be readily adapted for 3-axis operation by suitable modifications thereto. This is indicated by the dotted input leads to the storage circuits 32 in FIGURES 1 and 3 which would be connected to a Z position digitizer for the third axis position information and the dotted lines leading from storage circuits 58 in FIGURES 2 and 3 which would lead to a Z axis drive circuit. The Z axis drive may be included by way of an independent drive added to the apparatus already shown. 3-axis operation would be required, for the example illustrated, if the removal of portion 52a of the work piece 52 involves cuts at more than one level.

It should also be pointed out that with suitable modifications, the reference point in the recording portion of the system and the cutting tool in the play back portion of the system may be moved to trace and track the desired contour instead of moving the prototype and work piece articles. Among the factors to be considered in selecting the particular arrangement are the size of the prototype and work piece articles, the available space at the production facility, the particular operation being performed and the problems, if any, in continuously providing power to a moving tool.

While in most applications of the present invention the scale of the prototype and work piece articles will be the same, it is possible by adding a scaling factor to the recorded velocity data to effect a gain or attenuation in the contour which is traced. Where, for example, there are limitations in the recording portion of the system which prevent tracing very small segments, an enlarged prototype may be used and with the proper scaling the work piece article may be fabricated on the proper scale.

Although punched paper tape and related equipment have been described as the recording means, it will be obvious that other recording techniques may be employed with equal facility.

It is apparent from the foregoing that equipment constructed in accordance with the present invention provides many worthwhile and practical advantages. There is no need to derive the equations which describe the particular contours of interest nor is there need to furnish any equipment for solving such equations.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A contour tracing and tracking system comprising:
   means for tracing and tracking a desired contour;
   means for controlling the speed and direction of movement of said tracing and tracking means to trace said contour and for developing tracing speed signals representative of the tracing speed of said tracing and tracking means as said contour is being traced;
   sensing means for sensing the position of said tracing and tracking means and for developing tracing position signals representative of the position of said tracing and tracking means as said contour is being traced and tracking position signals representative of the position of said tracing and tracking means as said contour is being tracked;
   means responsive to said tracing position signals and said tracking position signals for developing drive signals dependent upon the difference between said tracing position signals and said tracking position signals;
   and means responsive to said tracing speed signals for scaling said drive signals in accordance with said tracing speed signals and for coupling said scaled drive signals to said tracing and tracking means to control the movement of said tracing and tracking means to track said contour.

2. A contour tracing and tracking system comprising:
   means for tracing and tracking a desired contour;
   means for controlling the speed and direction of movement of said tracing and tracking means to trace said contour and for developing tracing speed signals representative of the tracing speed of said tracing and tracking means as said contour is being traced;
   sensing means for sensing the position of said tracing and tracking means and for developing tracing position signals representative of the position of said tracing and tracking means as said contour is being traced and tracking position signals representative of the position of said tracing and tracking means as said contour is being tracked;
   means responsive to said tracing speed signals and said tracing position signals for recording data which said signals represent;
   means responsive to said recorded data for deriving tracing speed control signals representative of said tracing speed signals and tracing position control signals representative of said tracing position signals;
   means responsive to said tracing position control signals and said tracking position signals for developing drive signals dependent upon the difference between said tracing position control signals and said tracking position signals;
   and means responsive to said tracing speed control signals for scaling said drive signals in accordance with said tracing speed control signals and for coupling said scaled drive signals to said tracing and tracking means to control the movement of said tracing and tracking means to track said contour.

3. A contour tracing and tracking system according to claim 2 wherein the tracing speed signals and the tracing position signals are developed simultaneously at regular prescribed intervals and the tracing speed signals, the tracing position signals and the tracking position signals are in digital form.

4. A contour tracing and tracking system comprising:
   tracing means for tracing a desired contour;
   means for controlling the speed and direction of movement of said tracing means and for developing tracing speed signals representative of the tracing speed of said tracing means as said contour is being traced;
   first sensing means for sensing the position of said tracing means and for developing tracing position signals representative of the position of said tracing means as said contour is being traced;
   tracking means for tracking said desired contour;
   second sensing means for sensing the position of said tracking means and for developing tracking position signals representative of the position of said tracking means as said contour is being tracked;
   means responsive to said tracing position signals and said tracking position signals for developing drive signals dependent upon the difference between said tracing position signals and said tracking position signals;
   and means responsive to said tracing speed signals for scaling said drive signals in accordance with said tracing speed signals and for coupling said scaled drive signals to said tracking means to control the movement of said tracking means.

5. A contour tracing and tracking system comprising:
a movable tracing table for moving a desired contour past a reference point;
means for controlling the speed and direction of movement of said tracing table and for developing tracing speed signals representative of the speed of movement of said contour past said reference point;
first sensing means for sensing the position of said tracing table and for developing tracing position signals representative of the position of said tracing table as said contour moves past said reference point;
means responsive to said tracing speed signals and said tracing position signals for recording data which said signals represent;
means responsive to said recorded data for deriving tracing speed control signals representative of said tracing speed signals and tracing position control signals representative of said tracing position signals;
a movable tracking table for tracking said desired contour;
second sensing means for sensing the position of said tracking table and for developing tracking position signals representative of the position of said tracking table as said contour is being tracked;
means responsive to said tracing position control signals and said tracking position signals for developing drive signals dependent upon the difference between said tracing position control signals and said tracking position signals;
and means responsive to said tracing speed control signals for scaling said drive signals in accordance with said tracing speed control signals and for coupling said scaled drive signals to said tracking table to control the movement of said tracking table.

6. A contour tracing and tracking system comprising:
a movable tracing table for moving a desired contour past a reference point;
means for controlling the speed and direction of movement of said tracing table and for developing at regular prescribed intervals tracing speed signals representative of the speed of movement of said contour past said reference point at the time said tracing speed signals are developed;
first drive means responsive to said speed and direction control means for moving said tracing table to move said contour past said reference point;
first sensing means for sensing the position of said tracing table and for developing at the times said tracing speed signals are developed tracing position signals representative of the position of said tracing table as said contour moves past said reference point;
means responsive to said tracing speed signals and said tracing position signals for recording data which said signals represent;
means responsive to said recorded data for deriving at prescribed times tracing speed control signals representative of said tracing speed signals and tracing position control signals representative of said tracing position signals;
a movable tracking table for tracking said desired contour;
second sensing means for sensing the position of said tracking table and for developing at the times said tracing speed control signals and said tracing position control signals are derived tracking position signals representative of the position of said tracking table as said contour is being tracked;
means responsive to said tracing position control signals and said tracking position signals for developing drive signals dependent upon the difference between said tracing position control signals and said tracking position signals;
means responsive to said tracing speed control signals for scaling said drive signals in accordance with said tracing speed control signals;
and second drive means responsive to said scaled drive signals for moving said tracking table to track said contour.

7. A contour tracing and tracking system comprising:
a movable tracing table for moving a desired contour past a reference point;
means for controlling the speed and direction of movement of said tracing table and for developing at regular prescribed time intervals tracing speed signals, in digital form, representative of the speed of movement of said contour past said reference point at the time said tracing speed signals are developed;
first drive means responsive to said speed and direction control means for moving said tracing table to move said contour past said reference point;
first sensing means for sensing the position of said tracing table and for developing at the times said tracing speed signals are developed tracing position signals, in digital form, representative of the position of said tracing table as said contour moves past said reference point;
paper tape punch means responsive to said tracing speed signals and said tracing position signals for recording on a paper tape data which said signals represent;
paper tape reader means for sensing said paper tape and for deriving at prescribed times tracing speed control signals, in digital form, representative of said tracing speed signals and tracing position control signals, in digital form, representative of said tracing position signals;
a movable tracking table for tracking said desired contour;
second sensing means for sensing the position of said tracking table and for developing at the times said tracing speed control signals and said tracing position control signals are derived tracking position signals, in digital form, representative of the position of said tracking table as said contour is being tracked;
digital subtracting means responsive to said tracing position control signals and said tracking position signals for developing drive signals, in digital form, dependent upon the difference between said tracing position control signals and said tracking position signals;
means responsive to said tracing speed control signals for scaling said digital drive signals in accordance with said tracing speed control signals;
digital to analog converting means for converting said scaled digital drive signals into analog drive signals;
and second drive means responsive to said analog drive signals for moving said tracking table to track said contour.

8. A contour tracing and tracking system according to claim 7 wherein the scaling means include shift registers which store data representative of the digital drive signals and which shift the stored data in response to the tracing speed control signals.

9. A contour tracing and tracking system comprising:
a movable tracing table for moving a desired contour past a reference point;
means for generating first timing signals at regular prescribed time intervals;
means for controlling the speed and direction of movement of said tracing table and for developing in response to said first timing signals tracing speed signals representative of the speed of movement of said contour past said reference point at the time said tracing speed signals are developed;
first drive means responsive to said speed and direction control means for moving said tracing table to move said contour past said reference point;

first sensing means for sensing the position of said tracing table and for developing in response to said first timing signals tracing position signals representative of the position of said tracing table as said contour moves past said reference point;

means responsive to said tracing speed signals and said tracing position signals for recording in response to said first timing signals data which said tracing speed signals and said tracing position signals represent;

means for generating second timing signals at prescribed times;

means responsive to said recorded data for deriving in response to said second timing signals tracing speed control signals representative of said tracing speed signals and tracing position control signals representative of said tracing position signals;

a movable tracking table for tracking said desired contour;

second sensing means for sensing the position of said tracking table and for developing in response to said second timing signals tracking position signals representative of the position of said tracking table as said contour is being tracked;

means responsive to said tracing position control signals and said tracking position signals for developing drive signals dependent upon the difference between said tracing position control signals and said tracking position signals;

means responsive to said tracing speed control signals for scaling said drive signals in accordance with said tracing speed control signals;

tracking speed control means for selecting a desired speed of movement of said tracking table;

second drive means responsive jointly to said scaled drive signals and said tracking speed control means for moving said tracking table to track said contour at a desired speed;

and means responsive jointly to said tracing speed control signals and said tracking speed control means for controlling the times at which said second timing signals are generated.

10. A contour tracing and tracking system according to claim 9 wherein the tracking speed control means supply a series of pulses having a rate dependent upon the selected tracking speed and the means which control the times at which the second timing signals are generated include a counter which is initially set to a value representative of the tracing speed control signals and which subsequently counts the pulses supplied by the tracking speed control means and develops a second timing signal when the number of pulses counted corresponds to the initial setting of the counter.

11. A contour tracing and tracking system comprising:

a movable table for tracing and tracking a desired contour;

means for controlling the speed and direction of movement of said table to trace said contour and for developing tracing speed signals representative of the tracing speed of said table as said contour is being traced;

sensing means for sensing the position of said table and for developing tracing position signals representative of the position of said table as said contour is being traced and tracking position signals representative of the position of said table as said contour is being tracked;

means responsive to said tracing position signals and said tracking position signals for developing drive signals dependent upon the difference between said tracing position signals and said tracking position signals;

and means responsive to said tracing speed signals for scaling said drive signals in accordance with said tracing speed signals and for coupling said scaled drive signals to said table to control the movement of said table to track said contour.

12. A contour tracing and tracking system comprising:

a movable table for moving a desired contour past a reference point to trace said desired contour and for tracking said desired contour;

means for controlling the speed and direction of movement of said table to trace said contour and for developing tracing speed signals representative of the speed of movement of said contour past said reference point;

sensing means for sensing the position of said table and for developing tracing position signals representative of the position of said table as said contour moves past said reference point and tracking position signals representative of the position of said table as said contour is being tracked;

means responsive to said tracing speed signals and said tracing position signals for recording data which said signals represent;

means responsive to said recorded data for deriving tracing speed control signals representative of said tracing speed signals and tracing position control signals representative of said tracing position signals;

means responsive to said tracing position control signals and said tracking position signals for developing drive signals dependent upon the difference between said tracing position control signals and said tracking position signals;

and means responsive to said tracing speed control signals for scaling said drive signals in accordance with said tracing speed control signals and for coupling said scaled drive signals to said table to control the movement of said table to track said contour.

13. A contour tracing and tracking system comprising:

a movable table for moving a desired contour past a reference point to trace said desired contour and for tracking said desired contour;

means for controlling the speed and direction of movement of said table to trace said contour and for developing at regular prescribed time intervals tracing speed signals representative of the speed of movement of said contour past said reference point at the time said tracing speed signals are developed;

sensing means for sensing the position of said table and for developing tracing position signals representative of the position of said table as said contour moves past said reference point at the times said tracing speed signals are developed and tracking position signals representative of the position of said table as said contour is being tracked;

means responsive to said tracing speed signals and said tracing position signals for recording data which said signals represent;

means responsive to said recorded data for deriving tracing speed control signals representative of said tracing speed signals and tracing position control signals representative of said tracing position signals;

means responsive to said tracing position control signals and said tracking position signals for developing drive signals dependent upon the difference between said tracing position control signals and said tracking position signals;

means responsive to said tracing speed control signals for scaling said drive signals in accordance with said tracing speed control signals;

and drive means responsive to said speed and direction control means for moving said table to move said contour past said reference point and further responsive to said scaled drive signals for moving said table to track said contour.

14. A contour tracing and tracking system comprising:

a movable table for moving a desired contour past a reference point to trace said desired contour and for tracking said desired contour;

means for controlling the speed and direction of movement of said table to trace said contour and for developing at regular prescribed time intervals tracing speed signals, in digital form, representative of the speed of movement of said contour past said reference point at the time said tracing speed signals are developed;

sensing means for sensing the position of said table and for developing tracing position signals, in digital form, representative of the position of said table as said contour moves past said reference point at the times said tracing speed signals are developed and tracking position signals, in digital form, representative of the position of said table as said contour is being tracked;

paper tape punch means responsive to said tracing speed signals and said tracing position signals for recording on a paper tape data which said signals represent;

paper tape reader means for sensing said paper tape and for deriving tracing speed control signals, in digital form, representative of said tracing speed signals and tracing position control signals, in digital form, representative of said tracing position signals;

digital subtracting means responsive to said tracing position control signals and said tracking position signals for developing drive signals, in digital form, dependent upon the difference between said tracing position control signals and said tracking position signals;

means responsive to said tracing speed control signals for scaling said digital drive signals in accordance with said tracing speed control signals;

digital to analog converting means for converting said scaled digital drive signals into analog drive signals;

and drive means responsive to said speed and direction control means for moving said table to move said contour past said reference point and further responsive to said analog drive signals for moving said table to track said contour.

15. A contour tracing and tracking system comprising:

a movable table for moving a desired contour past a reference point to trace said desired contour and for tracking said desired contour;

means for generating first timing signals at regular prescribed intervals;

means for generating second timing signals at prescribed times;

means for controlling the speed and direction of movement of said table to trace said contour and for developing in response to said first timing signals tracing speed signals representative of the speed of movement of said contour past said reference point at the time said tracing speed signals are developed;

sensing means for sensing the position of said table and for developing in response to said first timing signals tracing position signals representative of the position of said table as said contour moves past said reference point and in response to said second timing signals tracking position signals representative of the position of said table as said contour is being tracked;

means responsive to said tracing speed signals and said tracing position signals for recording in response to said first timing signals data which said tracing speed and tracing position signals represent;

means responsive to said recorded data for deriving in response to said second timing signals tracing speed control signals representative of said tracing speed signals and tracing position control signals representative of said tracing position signals;

means responsive to said tracing position control signals and said tracking position signals for developing drive signals dependent upon the difference between said tracing position control signals and said tracking position signals;

means responsive to said tracing speed control signals for scaling said drive signals in accordance with said tracing speed control signals;

tracking speed control means for selecting a desired speed of movement of said table to track said contour;

and drive means responsive to said speed and direction control means for moving said table to move said contour past said reference point and further responsive jointly to said scaled drive signals and said tracking speed control means for moving said table to track said contour.

References Cited

UNITED STATES PATENTS

| 2,996,348 | 8/1961 | Rosenberg | 318—162 XR |
| 3,110,865 | 11/1963 | Scuitto | 318—162 XR |
| 3,366,934 | 1/1968 | Kelsey | 318—18 XR |

BENJAMIN DOBECK, *Primary Examiner.*

U.S. Cl. X.R.

318—30